United States Patent
Okubo

(10) Patent No.: US 7,202,586 B2
(45) Date of Patent: Apr. 10, 2007

(54) ELECTRICAL CONTACT MEMBER

(75) Inventor: Masashi Okubo, Nagano (JP)

(73) Assignee: Shinano Kenshi Kabushiki Kaisha, Nagano (JP)

( * ) Notice: Subject to any disclaimer, the term of this patent is extended or adjusted under 35 U.S.C. 154(b) by 0 days.

(21) Appl. No.: 10/534,248

(22) PCT Filed: Nov. 26, 2003

(86) PCT No.: PCT/JP03/15116

§ 371 (c)(1),
(2), (4) Date: May 10, 2005

(87) PCT Pub. No.: WO2004/053893

PCT Pub. Date: Jun. 24, 2004

(65) Prior Publication Data

US 2006/0017348 A1    Jan. 26, 2006

(30) Foreign Application Priority Data

Nov. 28, 2002    (JP)    ............................. 2002-344916

(51) Int. Cl.
*H02K 13/00*    (2006.01)
(52) U.S. Cl. ........................................ 310/253; 310/44
(58) Field of Classification Search ................ 310/42, 310/44, 248–253, 71
See application file for complete search history.

(56) References Cited

U.S. PATENT DOCUMENTS

| | | | | |
|---|---|---|---|---|
| 3,886,386 A | * | 5/1975 | Hillig | ......................... 310/251 |
| 5,830,326 A | * | 11/1998 | Iijima | ......................... 204/173 |
| 6,995,484 B1 | * | 2/2006 | Heimann et al. | ............. 310/45 |
| 2004/0000834 A1 | * | 1/2004 | Okubo et al. | ............... 310/233 |
| 2004/0000836 A1 | | 1/2004 | Okubo et al. | |
| 2005/0168113 A1 | * | 8/2005 | Hirai et al. | .................. 310/800 |

FOREIGN PATENT DOCUMENTS

| | | |
|---|---|---|
| JP | 2002-341060 A | 11/2000 |
| JP | 2002-75102 A | 3/2002 |
| JP | 2002-341061 A | 11/2002 |
| JP | 2003-284304 A | 10/2003 |
| JP | 2004-32963 A | 1/2004 |
| JP | 2004032963 A * | 1/2004 |
| WO | WO-02/059392 A1 | 8/2002 |

OTHER PUBLICATIONS

Peter W. Stephens "Physics & Chemistry of Fullerenes", 1995, pp. 217-222.*

* cited by examiner

*Primary Examiner*—Thanh Lam
(74) *Attorney, Agent, or Firm*—Birch, Stewart, Kolasch & Birch, LLP

(57) ABSTRACT

There is provided an electrical contact member where wear can be reduced. The electrical contact member is characterized by one or both of conductive metal particles and conductive metal fibers, at least outer circumferential surfaces of which have been modified with carbon nanofibers or carbon nanotubes, being disposed in a contact layer through which current flows.

15 Claims, 3 Drawing Sheets

ELECTRICAL CONTACT MEMBER

TECHNICAL FIELD

The present invention relates to an electrical contact member, and in particular to a contact member that can be used at contacts of brushes and a commutator of a motor or generator (dynamo), or at contacts of relays, switches, or connectors.

BACKGROUND ART

Metal-graphite brushes used in a conventional motor are manufactured by carrying out mixing, pressure forming, and baking processes on graphite as a brush material, pitch or synthetic resin powder as a binder, metal powder such as copper powder or silver powder, and, as necessary, an additive such as molybdenum disulfide that acts as a solid lubricant. When the included amount of metal powder is large, there are also cases where a binder is not used.

Also, the metal brushes of a motor and the electrical contacts of a relay are manufactured by fixing a contact member of silver-palladium, gold-silver, or the like onto a conductive spring member of phosphor bronze or the like, or by punching out a clad member where a contact member and a spring member are bonded together.

The electrical contacts of connector terminals are formed by tin plating the entire surface of a conductive spring member or gold plating only the contacts so as to reduce the contact resistance and to suppress the formation of an oxide film.

Conventionally, the selection of a material for electrical contacts is determined with overall consideration to the magnitude of the current flowing through the contacts, the contact resistance between the contact points, and the environment resistance with respect to a sulfide gas atmosphere and the like, with it presently not being possible to select an appropriate material without conducting experiments.

Out of conventional electrical contact members, motor brushes and relay contacts that are placed in moving contact are often designed and used with the premise of becoming worn so that an oxide film can be removed from the surface of the contact points.

Deterioration and wear of the contacts occur in the following ways: adhesive abrasion that occurs due to the materials composing the contacts adhering and the adhering parts being pulled off; abrasive abrasion where a hard material such as an oxide is produced either on the surfaces of one or both of the sliding surfaces of the contacts, or in the gap between both contacts, and soft components are scraped due to a blade-like effect of this hard material; arc abrasion, such as metal transfer and vaporization, that accompanies melting of the metal powder composing the sliding surfaces due to an electrical arc that occurs at the contacts; and erosion of the graphite composing the brushes and carbides in the binder that accompanies an overheating of the sliding parts.

It should be noted that to solve the above problems, the present applicant has developed brushes including carbon fibers made up of carbon nanofibers or carbon nanotubes and already filed a patent application (Japanese Patent Application No. 2002-189706).

The graphite used in conventional electrical contacts has a layered crystal structure and is anisotropic in that the electrical conductivity in a direction between the layers is remarkably small compared to the electrical conductivity in the same direction as the layers. For this reason, the contact resistance for graphite-graphite and graphite-metal greatly varies according to the contact direction for the graphite. For example, as shown in FIG. 9, since a sufficient current flows only in the direction of the layers in the graphite 8, current flows only in the direction shown by the arrow in FIG. 9, resulting in a loss in efficiency. It should be noted that reference numeral 5 designates the brush, 6 the commutator, and 7 copper powder. In addition, since there are hollows and many protrusions, the contact area with the commutator 6 is small and the sliding characteristics are poor regardless of a construction including graphite, so that the abrasive abrasion, arc abrasion, and erosion described above are likely, which results in a shorter working life. For this reason, to extend the working life, it is necessary to increase the length of the brushes and/or to use a brush replacement mechanism for regularly replacing the brushes. This results in an increase in the size of the part of the motor to which the brushes are attached and in increased importance for the motor user cleaning or replacing the brushes.

Also, when metal is used as the electrical contacts, contact resistance increases due to oxidization of the metal surface. When a noble metal is used, there are the problems of an increase in cost and of the metal composing the contacts melting and being vaporized due to an electrical arc. In the worst case, welding also occurs at the contacts.

It should be noted that as described in Japanese Patent Application No. 2002-189706, when carbon nanofibers or carbon nanotubes are simply mixed into a material, it is not always easy to stably disperse the carbon fibers in a contact layer.

The present invention was conceived to solve the problems described above, and it is an object of the present invention to provide an electrical contact member where wear can be reduced.

DISCLOSURE OF THE INVENTION

An electrical contact member according to the present invention is characterized by one or both of conductive metal particles and conductive metal fibers, at least outer circumferential surfaces of which have been modified with carbon nanofibers or carbon nanotubes, being disposed in a contact layer through which current flows.

A support layer is provided on a rear surface of the contact layer.

An initial wear layer may be formed on a contact surface side of the contact layer.

The electrical contact member may be fixed to a spring member that is plate-like or bar-like.

Graphite may be included in the contact layer.

Carbon nanofibers or carbon nanotubes may be separately included in the contact layer.

BEST MODE FOR CARRYING OUT THE INVENTION

It is possible to use well-known materials as the carbon nanofibers and carbon nanotubes (hereinafter also simply referred to as "carbon fibers") used by the present invention.

One or both of conductive metal particles and conductive metal fibers, at least outer circumferential surfaces of which have been modified with carbon nanofibers or carbon nanotubes, are disposed in a contact layer through which current flows.

Figure 1:
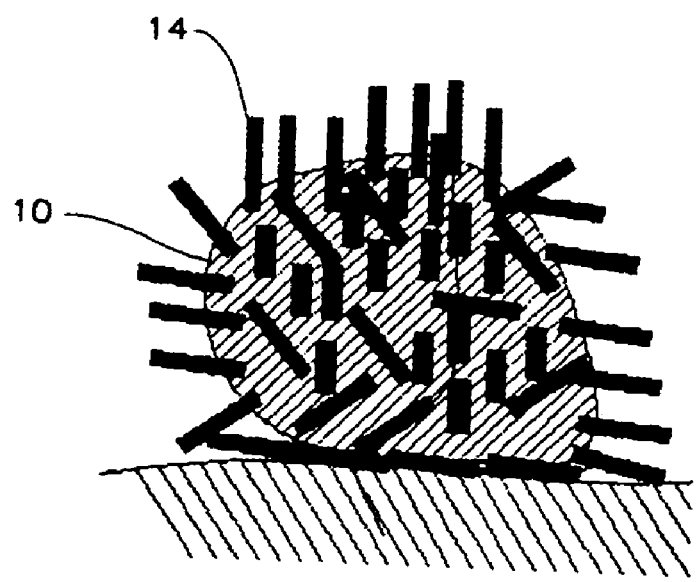
FIG. 1 is a diagram useful in explaining a metal particle that has been modified with carbon fibers.
Figure 2:
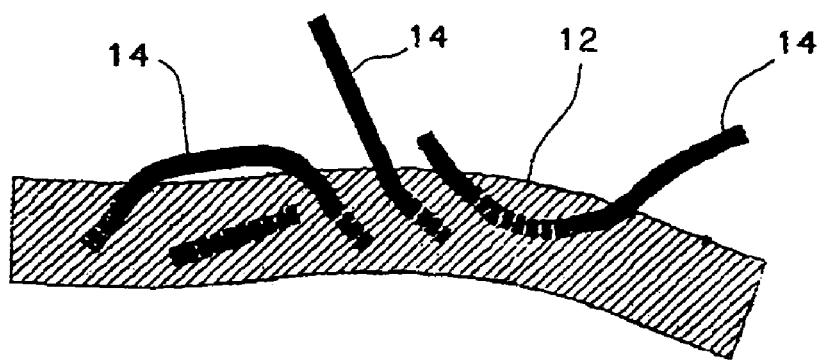
FIG. 2 is a diagram useful in explaining a metal fiber that has been modified with carbon fibers.

More specifically, as shown in FIGS. 1 and 2, the above expression "one or both of conductive metal particles and conductive metal fibers modified with carbon fibers" refers to a state where base parts of carbon fibers 14 are embedded into metal particles 10 or metal fibers 12 with the ends of the carbon fibers 14 protruding, a state where both ends of the carbon fibers 14 are embedded and central parts thereof protrude, and the like.

Some of the carbon fibers 14 are entirely embedded inside the metal particles 10 or the metal fibers 12.

Metal particles or conductive metal fibers whose outer circumferential surfaces have been modified in this way with carbon fibers are mixed with other materials, molded, and sintered to produce an electrical contact member.

To modify the metal particles 10 and the metal fibers 12 with the carbon fibers 14 as described above, carbon fibers are scattered in a non-oxidizing atmosphere, and by converting molten metal into particles or fibers in this non-oxidizing atmosphere using a piezoelectric pump, it is possible to attach and fix the carbon fibers to the surfaces of the particles or fibers. Alternatively, the composite made by kneading molten metal and carbon fibers may be milled to produce particles or fibers.

Alternatively, it is possible to produce metal particles or metal fibers that have been modified with carbon fibers by electroplating of metal and carbon fibers dispersed in a plating liquid, and then separating the metal particles or metal fibers from the cathode surface.

It is possible to use any of single wall and multiwall carbon fibers, and one or both ends of the fibers may be capped by fullerene caps.

It should be noted that the carbon nanofibers mentioned above are tubes where the lengths of the carbon nanofibers are at least one hundred times the diameter.

The modified metal is a conductive metal such as copper, aluminum or silver.

It should be noted that the metal particles referred to here are particles that are spherical, aspherical, or shaped as thin slices, and are not subject to any limitations regarding form.

Fibers with a diameter in a range of several nm to several hundred nm (for example, 300 nm) are used as the carbon fibers described above.

It should be noted that conductivity falls when the carbon fibers have a diameter of less than 15 nm. For carbon fibers with a diameter of less than 15 nm, conductivity is achieved when the two integers n and m (chiral indices) that determine the chiral vectors indicating the spiral direction of the crystal structure are as follows.

That is, when n−m=a multiple of 3, or when n=m.

For carbon fibers with a diameter of 15 nm or above, conductivity is achieved even when the chiral indices do not satisfy the above conditions.

In the present invention, a material in which carbon fibers are mixed is used as an electrical contact member, and since the above carbon fibers do not have anisotropic conductivity like graphite, current flows in all directions on the surface. The carbon fibers contact one another or contact other materials at the surface, so that it is sufficient to use metal particles or metal fibers where at least the outermost layer (the contact layer) has been modified with carbon fibers.

When the contact members are brushes, for example, one or both of metal particles and metal fibers that have been modified with carbon fibers are added into a material that composes normal graphite brushes or metal-graphite brushes, the material is mixed, pressure formed, and then baked to produce the brushes. It should be noted that this is only one example of the manufacturing process, and another process may be used.

Figure 3:
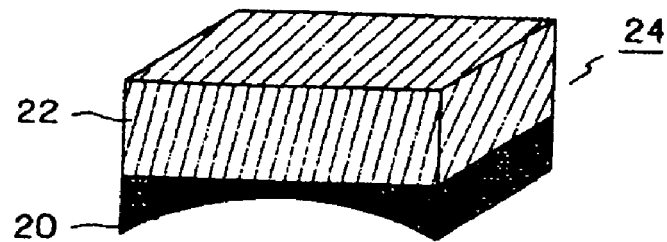
FIG. 3 shows an embodiment of a brush composed of a first brush layer and a second brush layer.

FIG. 3 shows a brush 24 where a first brush layer 20 that includes carbon nanofibers or carbon nanotubes is combined with a second brush layer 22 that does not include carbon nanofibers or carbon nanotubes. This brush 24 is formed by supplying material to a mold so that mixed particles of the brush material that include metal particles and/or metal fibers that have been modified with carbon nanofibers or carbon nanotubes are on a commutator side and mixed particles of the brush material that do not include such metal particles or metal fibers are on the non-commutator side, and by then pressure forming and baking the materials.

Since carbon fibers are extremely expensive, cost can be reduced by dividing the brush into the first brush layer 20 and the second brush layer 22 described above.

The brush material that does not include the above-described metal particles and metal fibers modified with carbon fibers includes graphite, metal powder, pitch or synthetic resin powder as a binder, and a solid lubricant as an additive. Out of these, the presence/absence and included amounts of metal powder, binder and additive are adjusted according to usage, and are not subject to any limitations.

In the same way, the modifying amount of carbon nanofibers or carbon nanotubes is adjusted according to usage, and is not subject to any limitations.

Figure 4:
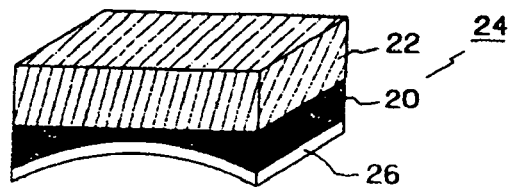
FIG. 4 shows an embodiment further provided with an initial wear layer (a third brush layer)

In FIG. 4, an example of a brush 24 provided with a third brush layer 26 on a contact surface side of the commutator of the first brush layer (contact layer) 20 of the brush shown in FIG. 3 is shown.

The third brush layer 26 is added as an initial wear layer with the object of rapidly producing, from an unstable contact state for the brush and the commutator, a favorable contact state due to wear of the brush layer caused by mechanical displacements or vibrations of the brush and the commutator when the motor is initially operated.

Figure 5:
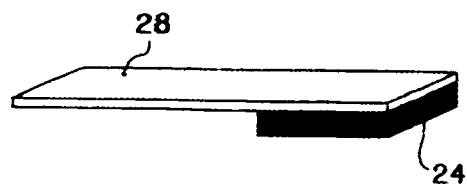
FIG. 5 shows an embodiment where a brush is attached to a plate spring.

FIG. 5 shows an embodiment where the brush 24 including the carbon nanofibers or carbon nanotubes described above is fixed to a plate spring 28.

Aside from the baked component described above, the brush 24 may be formed by injection molding a material produced by mixing metal particles or metal fibers that have been modified with the carbon nanofibers or carbon nanotubes described above into a synthetic resin.

As examples, the means of fixing the brush 24 to the plate spring 28 may be adhesion with a conductive adhesive or a mechanical fixing method such as screwing or crimping.

Figure 6:
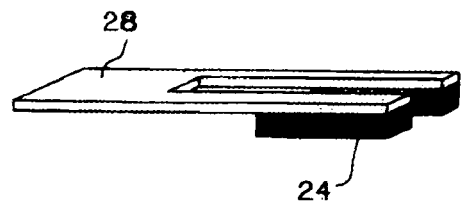
FIG. 6 shows an embodiment where the plate spring is split.

FIG. 6 shows an embodiment where contact between the brush 24 and the commutator is further stabilized by splitting a front end of the plate spring 28 of the embodiment shown in FIG. 5.

Although brushes have been described above as examples, other electrical contact members can be constructed in the same way.

The carbon nanofibers or carbon nanotubes described above are electrically one dimensional due to having a structure where one layer of the graphite crystal is rounded, so that a stabilized low electrical contact resistance is always obtained between the materials in the composition, such as between the carbon nanofibers or carbon nanotubes themselves, between the carbon nanofibers or carbon nanotubes and metal, and between the carbon nanofibers or carbon nanotubes and graphite.

Figure 7:
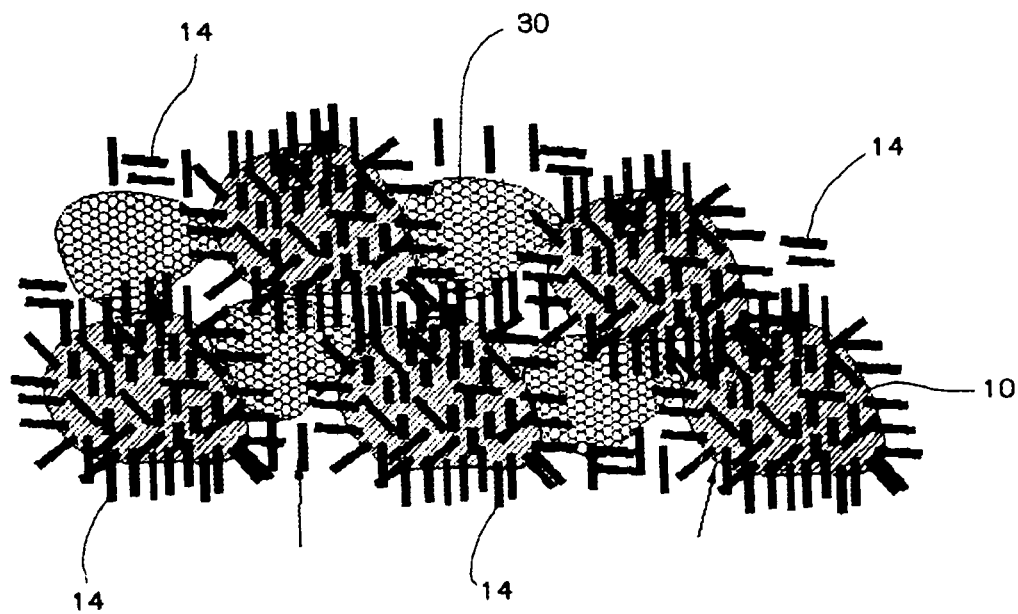
FIG. 7 is a schematic diagram showing a cross section of a brush.

Compared to the other materials that compose the electrical contacts, the carbon nanofibers or carbon nanotubes described above are minute, so that as shown in FIG. 7, the front ends of the carbon fibers 10 that protrude from the metal particles 10 and/or the metal fibers 12 project into gaps between the material particles. It should be noted that in FIG. 7, reference numeral 30 designates graphite. Carbon fibers 14 may also be separately mixed into the gaps between the material particles.

As a result, concaves on the contact material surface due to the gaps between the material particles are filled with the carbon nanofibers or carbon nanotubes described above, so that the surface roughness is improved and a smooth sliding surface or contact surface is obtained.

Figure 8:
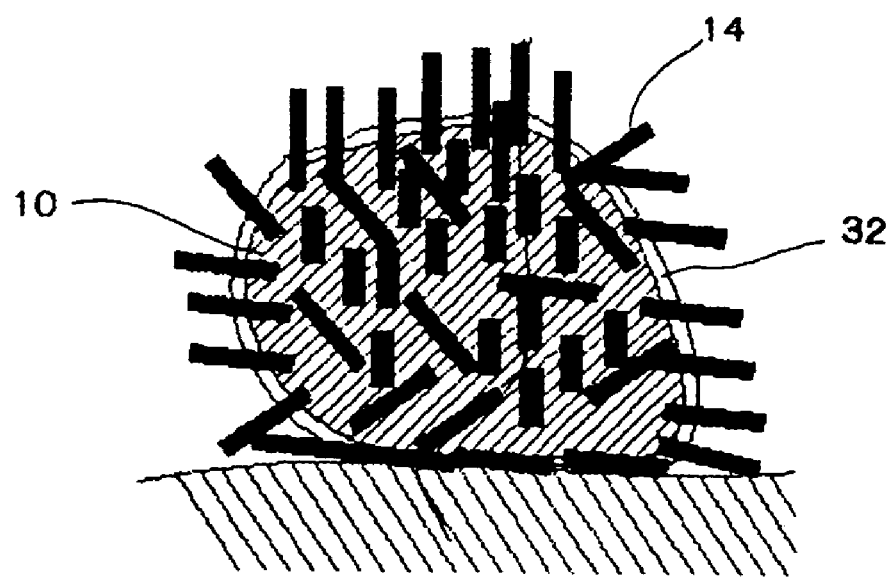
FIG. 8 is a diagram useful in explaining a state where an oxide film has been formed on a surface of a metal particle.
Figure 9:
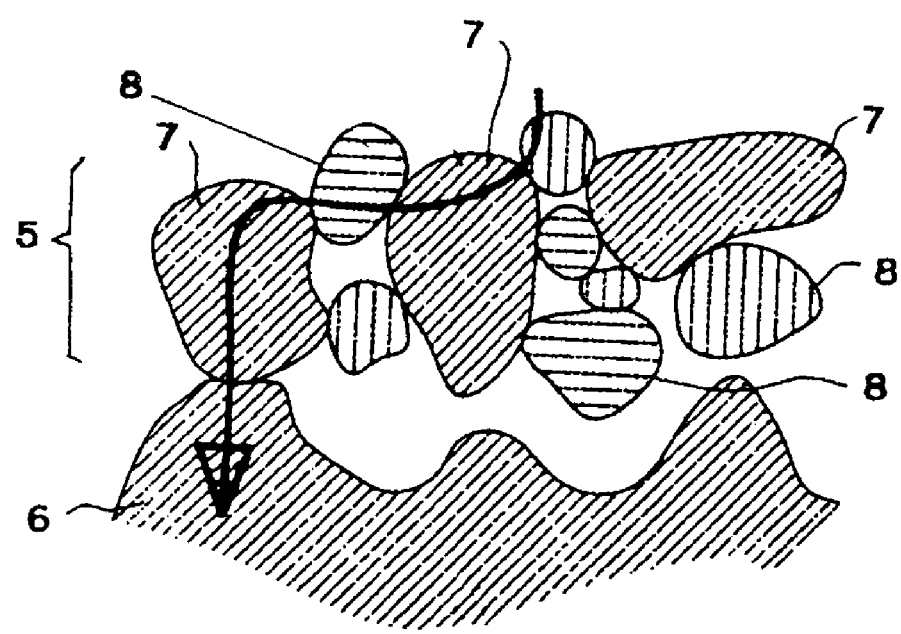
FIG. 9 is a schematic diagram showing a cross section of a conventional brush.

Also, as shown in FIG. 8, even if the surface of the metal particles 10 or metal fibers 12 is oxidized so that the particles or fibers are covered with a nonconductive oxidized film 32, the carbon fibers 14 that are conductive will still protrude from the metal particles 10 so that conductivity is maintained at the contact points and a decrease in the performance of the electrical contact member is prevented.

The melting point of the carbon nanofibers or carbon nanotubes described above is at least 2000° C. higher than a metal such as copper conventionally used for contacts, so that there is a reduction in wear due to metal transfer and scattering caused by metal in the composition melting due to electrical arcs.

In addition, the carbon nanofibers or carbon nanotubes described above are substances that have extremely high chemical stability and can be used in poor environments such as sulfide gas.

In addition, when the material is used as a sliding member such as brushes or a commutator, since the sliding surface is smoothed and there is a reduction in the incidence of convexes and concaves, there is a reduction in frictional resistance that conventionally occurs due to catching of the convexes and concaves present on the sliding surfaces of both the brush and commutator, and simultaneously there is a reduction in the production of protrusions due to metal transfer of the metal conductor caused by electrical arcs, resulting in a decrease in abrasive abrasion.

By improving the surface roughness of the sliding surface, the actual contact area between the brushes and commutator is increased. By doing so, the electrical contact resistance between the brushes and the commutator is reduced and the load and current applied to the contacts are dispersed, so that the production of heat at the actual contact points is reduced, adhesion between the sliding surfaces is made difficult, and adhesive abrasion is also reduced.

In addition, in the same way as the electrical conductivity, the carbon nanofibers or carbon nanotubes described above have a favorable thermal conductivity. As a result, heat produced at the sliding surfaces of the brushes and the commutator is rapidly dispersed inside the brushes, so that embrittlement of the brush structures and erosion of the graphite due to the sliding surfaces overheating are reduced. Accordingly, structural breakdown of the surfaces of the brushes that slide on the commutator due to thermal embrittlement of the structure is reduced.

EFFECT OF THE INVENTION

According to the present invention described above, unlike a conventional electrical contact member, even if a metal such as copper that is cheap compared to a noble metal is used for electrical contacts, the carbon nanofibers or carbon nanotubes fixed to the outer circumference of the metal particles and metal fibers have favorable electrical conductivity, so that even if a non-conductive oxide film is produced on the surface of the metal particles and the metal fibers exposed at the electrical contacts, an increase in the contact resistance of the electrical contacts can be prevented.

The large number of minute carbon nanofibers or carbon nanotubes act as electrical contact points and therefore increase the actual contact surface, the density of the current flowing at the contact points is reduced, and the mechanical load per unit surface area applied at the contact points is also reduced.

The favorable electrical conductivity, thermal conductivity, sliding performance, and high melting point of the carbon nanofibers or carbon nanotubes reduce the production of heat due to resistance loss and friction at the contacts, and wear at the contact points, adhesion between the contact points, and melting, vaporization, and the like of the metal composing the electrical contacts due to electrical arcs are reduced.

In addition, by using the metal particles and metal fibers, a stabilized dispersion of carbon nanofibers or carbon nanotubes on the electrical contacts can be easily realized compared to the case where the carbon nanofibers or carbon nanotubes are simply mixed into the material.

In particular, when an electrical contact member is produced by mixing the metal particles, the carbon nanofibers or carbon nanotubes, and other materials, even if an oxide film is generated due to oxidization of the surface of the metal particles or the metal fibers, the conductivity can be maintained by the protruding carbon nanofibers or carbon nanotubes, so that a decrease in the performance of the electrical contact member can be prevented.

The invention claimed is:

1. An electrical contact member, comprising:
   at least one from conductive metal particles and conductive metal fibers; and
   carbon nanofibers or carbon nanotubes embedded at least partially into the at least one from the conductive metal particles and the conductive metal fibers such that at least a portion of the carbon nanofibers or the carbon nanotubes protrudes from outer circumferential surfaces of the at least one from the conductive metal particles and the conductive metal fibers,
   wherein the at least one from the conductive metal particles and the conductive metal fibers having the embedded carbon nanofibers or the carbon nanotubes form a contact layer of the electrical contact member through which current flows.

2. The electrical contact member according to claim 1, further comprising:

a support layer provided on a rear surface of the contact layer.

3. The electrical contact member according to claim 1, further comprising:
an initial wear layer formed on a contact surface side of the contact layer.

4. The electrical contact member according to claim 2, further comprising:
an initial wear layer formed on a contact surface side of the contact layer.

5. The electrical contact member according to claim 1, wherein the electrical contact member is fixed to a plate-shaped or bar-shaped spring member.

6. The electrical contact member according to claim 1, further comprising:
graphite included in the contact layer.

7. The electrical contact member according to claim 2, further comprising:
graphite included in the contact layer.

8. The electrical contact member according to claim 3, further comprising:
graphite included in the contact layer.

9. The electrical contact member according to claim 1, wherein the carbon nanofibers or carbon nanotubes are separately included in the contact layer.

10. The electrical contact member according to claim 2, wherein the carbon nanofibers or carbon nanotubes are separately included in the contact layer.

11. The electrical contact member according to claim 3, wherein the carbon nanofibers or carbon nanotubes are separately included in the contact layer.

12. The electrical contact member according to claim 1, wherein said at least the portion of the carbon nanofibers or the carbon nanotubes protruding from the outer circumferential surfaces of the at least one from the conductive metal particles and the conductive metal fibers engage into gaps between other metal particles or metal fibers included in the electrical contact member.

13. The electrical contact member according to claim 1, wherein the contact layer is a contact layer of a graphite brush.

14. The electrical contact member according to claim 1, wherein said at least the portion of the carbon nanofibers or the carbon nanotubes protruding from the outer circumferential surfaces of the at least one from the conductive metal particles and the conductive metal fibers comprises a state where a base part of the carbon nanofibers or the carbon nanotubes are embedded into the at least one from the conductive metal particles and the conductive metal fibers with ends of the carbon nanofibers or the carbon nanotubes protruding from the outer circumferential surfaces of the at least one from the conductive metal particles and the conductive metal fibers.

15. The electrical contact member according to claim 1, wherein said at least the portion of the carbon nanofibers or the carbon nanotubes protruding from the outer circumferential surfaces of the at least one from the conductive metal particles and the conductive metal fibers comprises a state where both ends of the carbon nanofibers or the carbon nanotubes are embedded into the at least one from the conductive metal particles and the conductive metal fibers with central parts of the carbon nanofibers or the carbon nanotubes protruding from the outer circumferential surfaces of the at least one from the conductive metal particles and the conductive metal fibers.

* * * * *